Patented May 8, 1951

2,551,627

UNITED STATES PATENT OFFICE 2,551,627

STABILIZED POLYTHIONATES AS MEDICINAL COSMETICS

Torben Emil Neesby, Oslo, Norway, assignor to Norsk Sulfo Aktieselskap, Hovik, near Oslo, Norway, a Norwegian concern No Drawing. Application October 5, 1945, Serial No. 620,637. In Norway January 2, 1941

Section 1, Public Law 690, August 8, 1946
Patent expires January 2, 1961

1 Claim. (Cl. 167—58)

The invention concerns sulphur compounds in the form of polythionates and the application thereof for industrial, cosmetic, medicinal or other purposes, and aims at the production of polythionates and/or polythionic acids which are stable for a long time in solution. The invention embraces also the production of higher polythionates, namely those containing more than 6 atoms of sulphur per molecule of polythionate, it being of essential importance that such polythionates shall during or after production be subjected to a stabilisation process whereby the spontaneously proceeding decomposition is stopped. It is known from the literature that solutions of polythionates in the course of some few weeks undergo various changes, the polythionate molecule being broken down, with formation of higher or lower compounds and with the final result that the quantity of polythionate present is converted to sulphate, sulphite and crystalline sulphur.

This instability, which—however—does not prevent the production of pure polythionate salts, seems mainly to lie in the polythionate molecule itself, when this is in process of dissolution, although the instability may also be due to the presence in the solution of other ions, such as hydroxyl ions.

It is known from the literature that certain polythionates have a rather strong bactericidal effect. It has now been found possible to demonstrate that polythionates and polythionic acids both in organic and inorganic solutions can with great advantage be employed as cosmetics, for skin treatment and as prophylactic and curative agents in various diseases. In connection with the present invention polythionates and polythionic acids have therefore been subjected to careful investigation in order to solve the problem of producing solutions of these substances which will be stable for a considerable time, which is imperatively necessary if the application of such solutions is to acquire practical importance. A solution of this problem has now been reached, since by the procedure according to the invention it has been found possible to counteract the spontaneous or gradually arising decomposition of the molecules, in other words, to find some negative catalyst which is capable of preventing or checking the decomposition for the longest possible time.

It is found that the decomposition of the polythionates is dependent not only on the foreign substances that may be added, but also in some degree upon the concentration of the polythionate ions. The decomposition is likewise dependent on the temperature, being accelerated during rising temperatures.

It is obvious that this instability renders it difficult to produce pure solutions of polythionic acids, i. e., solutions containing only one kind of polythionate, since the molecules by degrees become divided up so as to form polythionates with molecules of greater or smaller size.

According to the invention stable solutions of polythionates or polythionic acids are obtained by adding to the freshly prepared solutions substances which are capable of regulating the redox potential, such as oxygen-emitting or electron-absorbing compounds.

Although from the composition of the polythionates they might be supposed to be powerful reductives, yet they do not react with iodine or potassium iodide solutions until after the lapse of some days, whereas with respect to stronger oxidising agents, such as permanganate and chromate, as well as large quantities of nitrite, they act as pronounced reductives. It is therefore probable that they have no definite redox potential, but that this is dependent on the catalysts present.

If care is now taken, by addition of oxygen/emitting agents to ensure that rH has a sufficiently high buffering value, by means of cupric or ferric ions or other ions or substances with similar properties, it will be observed that the decomposition of the polythionates is very effectively prevented.

Special advantages are attained by adding to the solution at a suitable moment acids or bases in such quntity that the final product has a pH which has been found by experience to be the most desirable. This addition, for instance of bases, may include both inorganic and organic compounds and may easily be made to coincide with the regulation of the rH. For example, one may add appropriate quantities of cupric or ferric compounds, such as hydroxides or carbonates, whereby cupric or ferric polythionates in more or less pure solution can be obtained at will. Furthermore, it has been found advantageous for certain purposes to prepare a solution of polythionic acids or polythionates in organic solvents, so that the finished product will contain more or less water, or even none at all.

Thus, for example, an alcoholic solution of cupric pentathionate, made in accordance with the invention, will be stabile, since its pH and its rH are fixed and a stabiliser is present. The solution prepared according to the invention may be given any desired position between aqueous solutions of polythionate or polythionic acid with fixed pH and rH as well as with stabilisers and pure organic solutions of metallic polythionates.

The higher polythionates are, as was to be expected, still more stable than the generally known forms, and it is therefore essential for their employment for technical purposes that their condensation can be stopped. The employment of the higher polythionates in medicine offers special advantages, as they have a physiological sulphur effect which is still stronger than that of the lower polythionates and it is therefore of great service in the production of skin preparations from polythionates to let the ingredients include some of the higher polythionates.

Polythionates and especially the higher forms can with particular advantage be employed in cosmetics and medicine instead of colloidal sulphur.

When solutions of colloidal sulphur are used for superficial application, as is usual in treatment of skin and hair, the object or surface treated will acquire a yellow or white appearance.

In many cases it will be extremely undesirable to let the object treated acquire such a colour, especially in treatment of scalp and hair, which thereby comes to have a grayish or whitish appearance. The treatment in such cases must be combined with subsequent washing in order to eliminate the further effects of the sulphur employed.

In the application of the method there is taken, for example, an ordinary crude sulphur sol, for instance, a Wackenroder solution, which probably contains all the possibly existing polythionates and higher complexes, and the fractions containing the ordinary polythionates and the aforesaid higher polythionates, or compounds of such empirical composition, are separated off by means of fractional precipitation, concentration or the like.

It has been found that with thus prepared solutions of the compounds in question, hair and skin may be treated without becoming stained, as is the case when using colloidal sulphur, provided that the acidity of the solution is adjusted to a pH of less than 5, preferably less than 3, by aid of strong acids, such as sulphuric acid, hydrochloric acid, but especially polythionic acid.

That the solutions produced do not contain material quantities of colloidal sulphur is clear from the fact that they show the Tyndall phenomenon only in slight degree. In ordinary light the solutions are of yellow-green colour and are quite clear.

Below are given some examples of modes of execution which will serve to illustrate the application of the invention:

1. An alkaline salt prepared in known manner from tetrathionic acid is dissolved in distilled water to a strength of about 2 per cent. The pH is adjusted to 1.5 with pure hydrochloric acid. After addition of 1 gm. of thyrosine, the solution is placed in a thermostat at 50° C. and in the course of 14 days a decrease in the tetrathionate concentration of 3 millimols per litre is observed, while a sample without thyrosine showed a decrease of about 5 millimols per litre in the same period.

2. As in example 1, with further addition of 2 cubic cm. of a normal copper sulphate solution per litre. In the course of one week in the thermostat a decrease of 1.5 millimol of tetrathionate per litre was observed.

The stabilized solutions of tetra- and pentathionates have a powerful sulphur action, which can not only be utilized for cutaneous application, but also renders the solutions specially suitable or use when it is a question of injections for widely different purposes in the field of medical science. The polythionates can also be employed for technical purposes and for the spraying of plants.

I claim:

A composition of matter comprising a cosmetic base, a compound having the formula $R_2S_nO_6$ in which R is a cation of the group consisting of $H^+$, $Li^+$, $Na^+$ and $K^+$ and $n$ is an integer 4 or 5, and, in intimate physical association with the compound, a negative catalyst of the group consisting of cupric and ferric ions added as a salt in an amount which is in very small proportion with respect to the compound of the thionic radical which suppresses the decomposition of the thionic radical $S_nO_6^=$ and the resulting liberation of elemental sulphur and sulphur dioxide for relatively long periods when the composition is at room temperature and in contact with water, whereby the solution remains clear.

TORBEN EMIL NEESBY.

REFERENCES CITED

The following references are of record in the file of this patent:

UNITED STATES PATENTS

| Number | Name | Date |
|---|---|---|
| 1,792,097 | Jacobson | Feb. 10, 1931 |
| 1,832,325 | Rosenstein | Nov. 17, 1931 |
| 1,843,224 | Hansen | Feb. 2, 1932 |
| 1,917,351 | Young | July 11, 1933 |
| 1,944,978 | Hansen | Jan. 30, 1934 |
| 1,949,797 | Kaufmann | Mar. 6, 1934 |
| 1,979,934 | Hansen | Nov. 6, 1934 |
| 1,980,236 | Torigian | Nov. 13, 1934 |
| 2,149,249 | Nitsche | Feb. 28, 1939 |
| 2,201,124 | Ehman et al. | May 14, 1940 |

FOREIGN PATENTS

| Number | Country | Date |
|---|---|---|
| 344,841 | Great Britain | Sept. 9, 1929 |
| 379,436 | Germany | Feb. 11, 1922 |

OTHER REFERENCES

Liming: Phytopathology; vol. 23, January 1933, pages 155–165, 173, 174.

McKee et al.: Journal of Investigative Dermatology; June 1945, pages 389–422.

Gmelin-Kraut: "Handbuch der Anorganischen Chemie; Band II, Abteilung I, page 341 (1906).

Mellor: "Modern Inorganic Chemistry"; 1939, Longmans, Green and Co. N. Y., p. 477–479.

Deines et al.; Chemical Abstracts, vol. 27, p. 5018, 1933.

Stamm et al.; Chemical Abstracts, vol. 35, p. 3185, 1941.